(12) United States Patent
Sullivan et al.

(10) Patent No.: US 9,075,493 B2
(45) Date of Patent: Jul. 7, 2015

(54) TECHNIQUES TO PRESENT HIERARCHICAL INFORMATION USING ORTHOGRAPHIC PROJECTIONS

(75) Inventors: Lee Ann Sullivan, Cary, NC (US); Jordan Riley Benson, Raleigh, NC (US); Rajiv Ramarajan, Cary, NC (US); Paul Hankey, Raleigh, NC (US); Frank Lee Wimmer, Raleigh, NC (US)

(73) Assignee: SAS INSTITUTE, INC., Cary, NC (US)

( * ) Notice: Subject to any disclaimer, the term of this patent is extended or adjusted under 35 U.S.C. 154(b) by 335 days.

(21) Appl. No.: 13/042,290

(22) Filed: Mar. 7, 2011

(65) Prior Publication Data

US 2012/0233573 A1  Sep. 13, 2012

(51) Int. Cl.
*G06F 3/048* (2013.01)
*G06F 3/0481* (2013.01)

(52) U.S. Cl.
CPC ............ *G06F 3/048* (2013.01); *G06F 3/04815* (2013.01)

(58) Field of Classification Search
CPC ................ G06F 3/048; G06F 3/04815; G06F 17/30873; G06T 19/00
USPC .................................................. 715/848–856
See application file for complete search history.

(56) References Cited

U.S. PATENT DOCUMENTS

| | | | |
|---|---|---|---|
| 5,136,717 A * | 8/1992 | Morley et al. | 712/16 |
| 6,002,406 A * | 12/1999 | Zhao | 345/581 |
| 6,493,858 B2 * | 12/2002 | Solomon | 716/119 |
| 6,577,714 B1 * | 6/2003 | Darcie et al. | 379/93.17 |
| 6,583,794 B1 | 6/2003 | Watenberg | |
| 7,283,135 B1 * | 10/2007 | Cote et al. | 345/428 |
| 7,506,274 B2 | 3/2009 | Zhang et al. | |
| 7,554,543 B2 * | 6/2009 | Aguera Y Arcas | 345/428 |
| 8,453,091 B1 * | 5/2013 | Rao et al. | 716/118 |
| 2003/0040893 A1 * | 2/2003 | Popovici | 703/2 |
| 2003/0142871 A1 * | 7/2003 | Ishikawa | 382/233 |
| 2004/0153674 A1 * | 8/2004 | Hayashi | 713/202 |
| 2004/0177251 A1 * | 9/2004 | Hayashi | 713/161 |
| 2006/0146053 A1 * | 7/2006 | Gatewood et al. | 345/440 |

(Continued)

OTHER PUBLICATIONS

"Truck Sales Slip, Tripping up Chrysler", The New York Times: Business: Image, Feb. 25, 2007, retrieved from http://www.nytimes.com/imagepages/2007/02/25/business/20070225_Chrysler_Graphic on Nov. 17, 2010.

(Continued)

*Primary Examiner* — Tadeese Hailu

(74) *Attorney, Agent, or Firm* — Kacvinsky Daisak Bluni PLLC

(57) ABSTRACT

Techniques to present hierarchical information as orthographic projections are described. An apparatus may comprise an orthographic projection application arranged to manage a three dimensional orthographic projection of hierarchical information. The orthographic projection application may comprise a hierarchical information component operative to receive hierarchical information representing multiple nodes at different hierarchical levels, and parse the hierarchical information into a tree data structure, an orthographic generator component operative to generate a graphical tile for each node, arrange graphical tiles for each hierarchical level into graphical layers, and arrange the graphical layers in a vertical stack, and an orthographic presentation component operative to present a three dimensional orthographic projection of the hierarchical information with the stack of graphical layers each having multiple graphical tiles. Other embodiments are described and claimed.

45 Claims, 16 Drawing Sheets

(56) References Cited

U.S. PATENT DOCUMENTS

| | | | |
|---|---|---|---|
| 2006/0271884 A1* | 11/2006 | Hurst | 715/854 |
| 2007/0252834 A1* | 11/2007 | Fay | 345/428 |
| 2008/0046816 A1 | 2/2008 | Cao et al. | |
| 2009/0013273 A1* | 1/2009 | Fuchs et al. | 715/764 |
| 2011/0007094 A1* | 1/2011 | Nash et al. | 345/634 |
| 2011/0316854 A1* | 12/2011 | Vandrovec | 345/420 |
| 2012/0154444 A1* | 6/2012 | Fernandez | 345/655 |

OTHER PUBLICATIONS

"Statistics 120: Mosaic Plots" retrieved from http://www.stat.auckland.ac.nz/~ihaka/120/Lectures/lecture17.pdf on May 7, 2010.

Bladh, Thomas et al., "The Effect of Animated Transitions on User Navigation in 3D Tree-Maps", The Proceedings of 9th International Conference on Information Visualization (IV 2005), London, UK, Jul. 2005. 9 pages.

Bruls, Mark et al., "Squarified Treemaps" Eindhoven University of Technology, Dept. of Mathematics and Computer Science, The Netherlands. 10 pages.

Johnson, Brian et al., "Tree-Maps: A Space-Filling Approach to the Visualization of Hierarchical Information Structures", University of Maryland, Department of Computer Science & Human-Computer Interaction Laboratory, 1991. 8 pages.

Lu, Hao et al., "Cascaded Treemaps: Examining the Visibility and Stability of Structure in Treemaps", University of Washington, Computer Science & Engineering DUB Group, 2008. 8 pages.

Schneiderman Ben et al., "Treemaps for space-constrained visualization of hierarchies", Jun. 25, 2009, 12 pages. http://www.cs.umd.edu/hcil/treemap-history.

De Ville, et al., "Decision Tree for Analytics Using SAS Enterprise Miner", SAS Institute Inc., Jun. 2013, pp. 1-18.

De Ville, et al., "Decision Tree for Analytics Using SAS Enterprise Miner", SAS Institute Inc., Jun. 2013, pp. 19-36.

* cited by examiner

TECHNIQUES TO PRESENT HIERARCHICAL INFORMATION USING ORTHOGRAPHIC PROJECTIONS

BACKGROUND

Information is growing at an accelerating rate. Computer-based information systems are continually innovating in order to manage, organize and present these growing volumes of information. A decision support system (DSS) is an example of a type of information system that supports business or organizational decision-making activities. Information systems such as a DSS manage information assets, such as legacy and relational data sources, data cubes, data warehouses, data marts, and so forth. Despite improvements in managing information assets, however, presentation techniques for information are still based on two dimensional graphical user interface (GUI) techniques. Conventional two dimensional GUI techniques are insufficient to present, navigate and interact with ever-increasing data sets managed by modern information systems. It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques to manage, present, navigate, and interact with hierarchical information. Some embodiments are particularly directed to techniques to present hierarchical information using three dimensional orthographic projections.

In one embodiment, for example, an apparatus may comprise an orthographic projection application arranged to manage a three dimensional orthographic projection of hierarchical information. An example of hierarchical information may include, for example, a tree structure. The orthographic projection application may comprise a hierarchical information component operative to receive hierarchical information representing multiple nodes at different hierarchical levels, and parse the hierarchical information into a tree data structure. The orthographic projection application may further comprise an orthographic generator component operative to generate a graphical tile for each node, arrange graphical tiles for each hierarchical level into graphical layers, and arrange the graphical layers in a vertical stack. The orthographic projection application may still further comprise an orthographic presentation component operative to present a three dimensional orthographic projection of the hierarchical information with the stack of graphical layers each having multiple graphical tiles. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
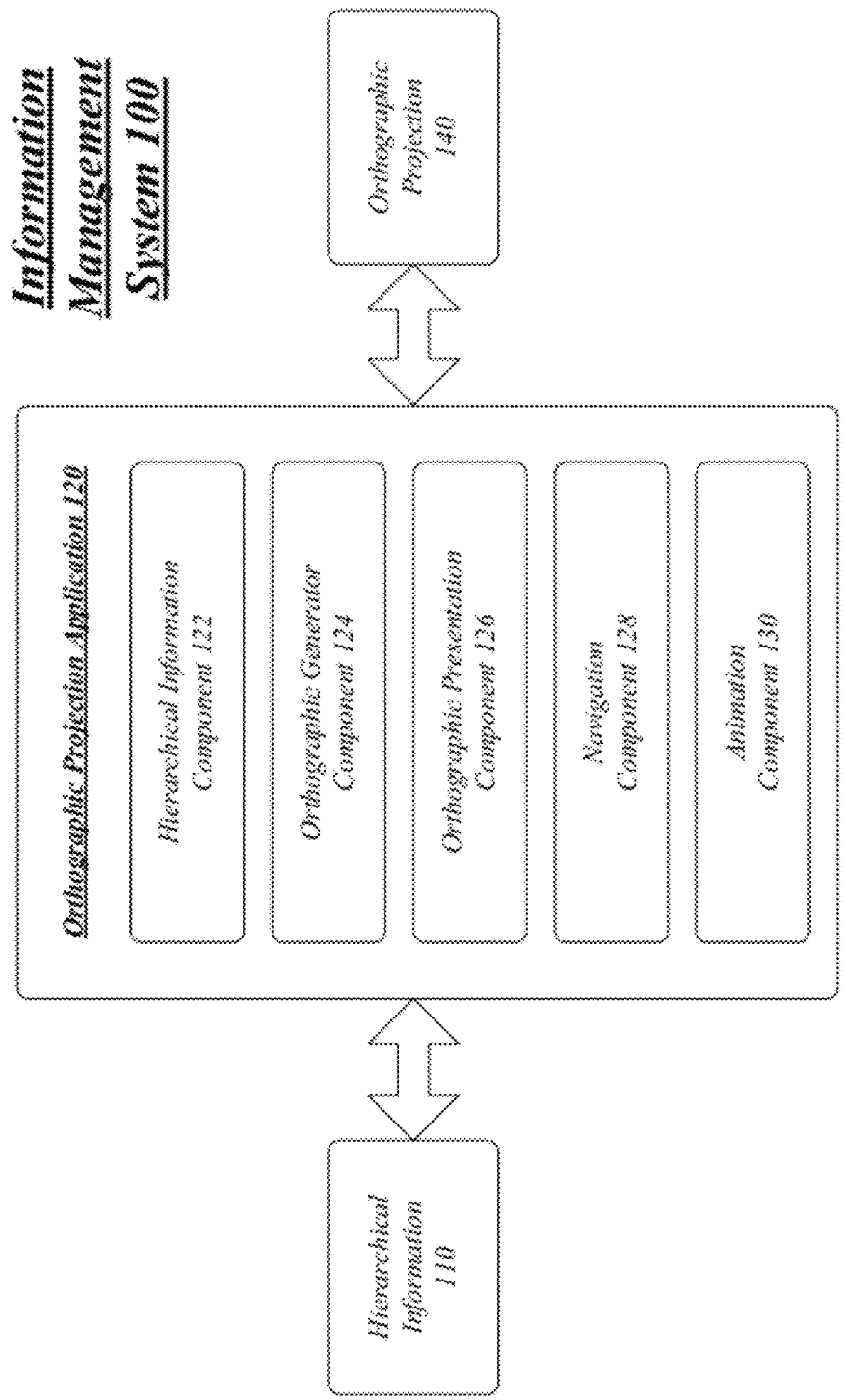
FIG. 1 illustrates an embodiment of an information management system.

Various embodiments are directed to techniques to manage hierarchical information using orthographic projections. An example of hierarchical information may include without limitation a tree structure. Orthographic projection (or orthogonal projection) is a technique to represent a three-dimensional object in two dimensions. It is a form of parallel projection, where all the projection lines are orthogonal to the projection plane, resulting in every plane of the scene appearing in affine transformation on the viewing surface.

In various embodiments, hierarchical information, such as a tree structure, may be organized into graphical nodes and graphical layers using various tree map structure techniques. The graphical layers may be organized into a vertical stack, and presented as an orthographic projection, thereby allowing a viewer to visualize the tree map structure in three dimensions rather than a conventional two dimensions. Further, the orthographic projection allows a viewer to navigate through the hierarchical information using multiple navigation techniques, such as surfacing sets of graphical tiles from different graphical layers, or entire graphical layers, to a top layer (or working layer). The former case allows a viewer to perform complex comparisons of hierarchical information across multiple hierarchical levels, while the latter case allows for closer inspection of a given hierarchical level. Once a desired set of hierarchical information has been surfaced to a top layer, the top layer may be manipulated to present the hierarchical information in different ways, such as a three dimensional orthographic projection view, a two dimensional flat view, different graphical charts or tables, different viewing angles and perspectives, and so forth. Other features and advantages are provided below. As a result, the embodiments can improve affordability, scalability, modularity, extendibility, or interoperability for an operator, device or network.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a block diagram for an information management system 100. The information management system 100 may be generally arranged to manage different types of information, including hierarchical information and non-hierarchical information having some form of defined relationships or order. The information management system 100 may be particularly arranged to handle large volumes of hierarchical information typically not suitable for traditional graphical visualization and analysis, such as through charts, graphs or tables. In one embodiment, for example, the information management system 100 may comprise a DSS designed to handle massive amounts of centralized or distributed information for a given business, enterprise or organization across multiple entities, products, services and geographies. A DSS may comprise a computer-based information system that supports decision-making activities for a business or organization.

The information management system 100 may have one or more software applications and/or components. Although the information management system 100 shown in FIG. 1 has a limited number of elements in a certain topology, it may be appreciated that the information management system 100 may include more or less elements in alternate topologies as desired for a given implementation.

The information management system 100 may comprise an orthographic projection application 120. The orthographic projection application 120 may be generally arranged to manage a three dimensional orthographic projection of hierarchical information 110. The orthographic projection application 120 may include, among other elements, a hierarchical information component 122, an orthographic generator component 124, an orthographic presentation component 126, a navigation component 128 and an animation component 130. The orthographic projection application 120 may have more or less components, as desired for a given implementation. The embodiments are not limited in this context.

The information management system 100 in general, and the orthographic projection application 120 in particular, solves many problems associated with conventional information visualization systems. For example, tree map visualizations of data sets with deep or complex hierarchies often have trouble effectively displaying multiple levels of the hierarchy at the same time. When a tree structure is represented in tree map structure form, each layer is typically displayed separately, or all layers are shown at once with lower levels nested in the higher levels. A separated layers view makes it easier to compare tree nodes that are at the same depth, which is a common use of tree map structures, but it is difficult to compare tree nodes at different levels and understand the structure of the data since the relationships between the nodes are not readily visible. A nested layers view allows the structure of the data to be seen since the parent-child relationships are visible. However, colors are typically used to reinforce layer separation. This is not normally the case in tree map structures and without this extra encoding it can become difficult to determine which nodes are on the same level in the hierarchy. Another problem with a nested tree map structure is that the relative sizes of the nodes are no longer comparable due to the padding adding during the nesting operation. As the complexity of the data set increases, these problems become more severe. Another attempted solution to the problem employs a cascading view. This method does not distort the relative sizes of the nodes and still allows the hierarchy to be represented. However, comparison between non-leaf nodes is still difficult, and without using color to distinguish the different levels, it can be hard to determine what hierarchical level a given node is from.

To solve these and other problems, the orthographic projection application 120 is arranged to implement various orthographic visualization techniques that allows for effective comparison between all nodes in hierarchical information 110 and maintains a coherent and navigable representation of the underlying structure of the data at the same time.

In one embodiment, the orthographic projection application 120 may comprise a hierarchical information component 122. The hierarchical information component 120 may be operative to receive hierarchical information 110 representing multiple nodes at different hierarchical levels, and parse the hierarchical information 110 into a tree structure.

Hierarchical information 110 may refer to any information organized into some form of a hierarchy. A hierarchy is an ordered set or an acyclic graph. A hierarchy may comprise an arrangement of items in which the items are represented as being above, below or at a same level as one another. A classic example of hierarchical information 110 is a tree structure, although others exist as well.

In one embodiment, the hierarchical information 110 may comprise a tree structure of nodes comprising a root node, interior nodes and leaf nodes. A tree structure is an acyclic connected graph of nodes. A node is a structure which may contain a value, a condition, or represent a separate data structure, which could be a tree structure of its own. A node may have zero or more children nodes and at most one parent node. Furthermore, the children of each node have a specific order. A topmost node in a tree is called a root node. A node that has one or more child nodes is called an interior node. A node that does not have any child nodes is called a leaf node.

The hierarchical information component 120 may receive hierarchical information 110 representing multiple nodes at different hierarchical levels, and parse the hierarchical information 110 into a tree structure. A hierarchical level of the hierarchical information 110 may comprise, for example, a set of nodes having a same distance from a root node. The hierarchical information component 120 may receive the hierarchical information 110, such as from a local or remote datastore, and parse the hierarchical information 110 into a tree data structure having a data schema suitable for use by the orthographic projection application 120. To the extent that the hierarchical information 110 and the orthographic projection application 120 use different data schemas, one or more custom translation components (not shown) may be used to translate the hierarchical information 110 from a native data schema to one used by the orthographic projection application 120.

In one embodiment, the orthographic projection application 120 may comprise an orthographic generator component 124. The orthographic generator component 124 may be operative to generate a graphical tile for each node, arrange graphical tiles for each hierarchical level into graphical layers, and arrange the graphical layers in a vertical stack.

The orthographic generator component 124 may be operative to generate a tile or graphical tile for each node of the hierarchical information 110. A graphical tile may refer to a graphical user interface (GUI) element having visual characteristics representing information, attributes or properties of a node. For instance, a graphical tile may have a square or rectangular shape corresponding to a numerical attribute of a node, such as a number of automobiles made by an automobile manufacturer. In this case, a size or area of the graphical tile may be proportional to the number of automobiles.

The orthographic generator component 124 may arrange graphical tiles for hierarchical levels into corresponding graphical layers. A graphical layer may refer to a GUI element having visual characteristics representing information, attributes or properties of nodes having a same distance from a root node. A graphical layer may comprise a planar layer, with the graphical tiles nested within the planar layer.

In one embodiment, each graphical layer may comprise or be implemented as a tree map structure of graphical tiles. A tree structure visualizes hierarchical information 110 as a graph with nodes and links (or edges). Although effective in presenting organization of information, a tree structure consumes a significant amount of space for those areas not used to present a node or an edge. A tree map structure visualizes hierarchical information 110 using nested rectangles, and therefore provides a more compact display relative to a tree structure. Each branch of the tree is given a rectangle, which is then tiled with smaller rectangles representing sub-branches. A tile for a leaf node has an area proportional to a specified dimension on the data. Often the leaf nodes are colored to show a separate dimension of the data. When the color and size dimensions are correlated in some way with the tree structure, visual patterns may emerge to facilitate consumption of the data. As a result, a tree map structure can legibly present thousands of items on a display simultaneously.

The orthographic generator component 124 may create a tree map structure utilizing different treemap algorithms. Treemap algorithms can broadly be categorized as rectangular or non-rectangular algorithms. Rectangular algorithms are based on a rectangular geometry, and are sometimes referred to as tiling algorithms. A tiling algorithm defines a way to divide a rectangle into sub-rectangles of specified areas. Examples of rectangular algorithms may include without limitation a binary tree algorithm, an ordered algorithm, a slice and dice algorithm, a squarified algorithm, a strip algorithm, a mixed treemaps algorithm, and so forth. Examples of non-rectangular algorithms may include without limitation voronoi treemaps algorithm, jigsaw treemaps algorithms, and so forth. In one embodiment, for example, the orthographic generator component 124 may use a squarified algorithm. However, the embodiments are not limited in this context.

The orthographic generator component 124 may present different graphical tiles 502-*a* representing a same numerical attribute with a same size area within each graphical layer 504-*b*. In some cases, a tiling algorithm attempts to create rectangles having an aspect ratio close to one, in order to preserve some sense of the ordering in the input data, and would change to reflect changes in the underlying data. These properties may have an inverse relationship. As the aspect ratio is optimized, the order of placement becomes less predictable. As the order becomes more stable, the aspect ratio is degraded.

Once the graphical layers are generated, the orthographic generator component 124 may arrange the graphical layers into a vertical stack. The vertical stack may represent a defined ordering of graphical layers, beginning with a top layer representing a root node, one or more interior layers representing interior nodes, and a bottom layer representing leaf nodes. The vertical stack may have other defined orderings as well. The vertical stack may be manipulated, in response to user control directives or changes in underlying data, to move sets of graphical tiles or entire graphical layers to different positions within the vertical stack.

In one embodiment, the orthographic projection application 120 may comprise an orthographic presentation component 126. The orthographic presentation component 126 may be operative to present a three dimensional orthographic projection 140 of the hierarchical information 110 with the vertical stack of graphical layers each having multiple graphical tiles. Orthographic projection (or orthogonal projection) is a technique to represent a three-dimensional object in two dimensions. It is a form of parallel projection, where all the projection lines are orthogonal to the projection plane, resulting in every plane of the scene appearing in affine transformation on the viewing surface. It is further divided into multiview orthographic projections and axonometric projections. The term orthographic is also sometimes reserved specifically for depictions of objects where the axis or plane of the object is also parallel with the projection plane, as in multiview orthographic projections. Examples for the orthographic projection 140 may be illustrated and described with reference to FIGS. 5-9.

In one embodiment, the orthographic projection application 120 may comprise a navigation component 128. The navigation component 120 may be operative to receive user control directives and generate different GUI views for the three dimensional orthographic projection 140 based on the received user control directives. The navigation component 120 may receive user control directives from various input devices, such as pointing devices, a keyboard, a touch screen, and so forth.

In one embodiment, the orthographic projection application 120 may comprise an animation component 130. The animation component 130 may be operative to animate a transition between different GUI views for the three dimensional orthographic projection 140. Navigating between alternate GUI views may sometimes result in abrupt transitions as users move between the GUI views. Either some part of the original view becomes the new view (expand), or the original view becomes a smaller part of the new (collapse). During these operations viewers may have difficulty reconciling the two views. The animation component 130 may implement space-filling visualizations to smoothly animate transitions between GUI views. The animation may assist a user in relating two states of the information management system 100. The animation component 130 may perform, for example, an animated transformation of an object or objects in a GUI view. The animated transition may be for any length of time, although relatively brief transitions (e.g., as measured in milliseconds) are typically desired to reduce latency for viewers. Any type of animation techniques may be used to facilitate transitions between GUI views, and the embodiments are not limited in this context.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 2:
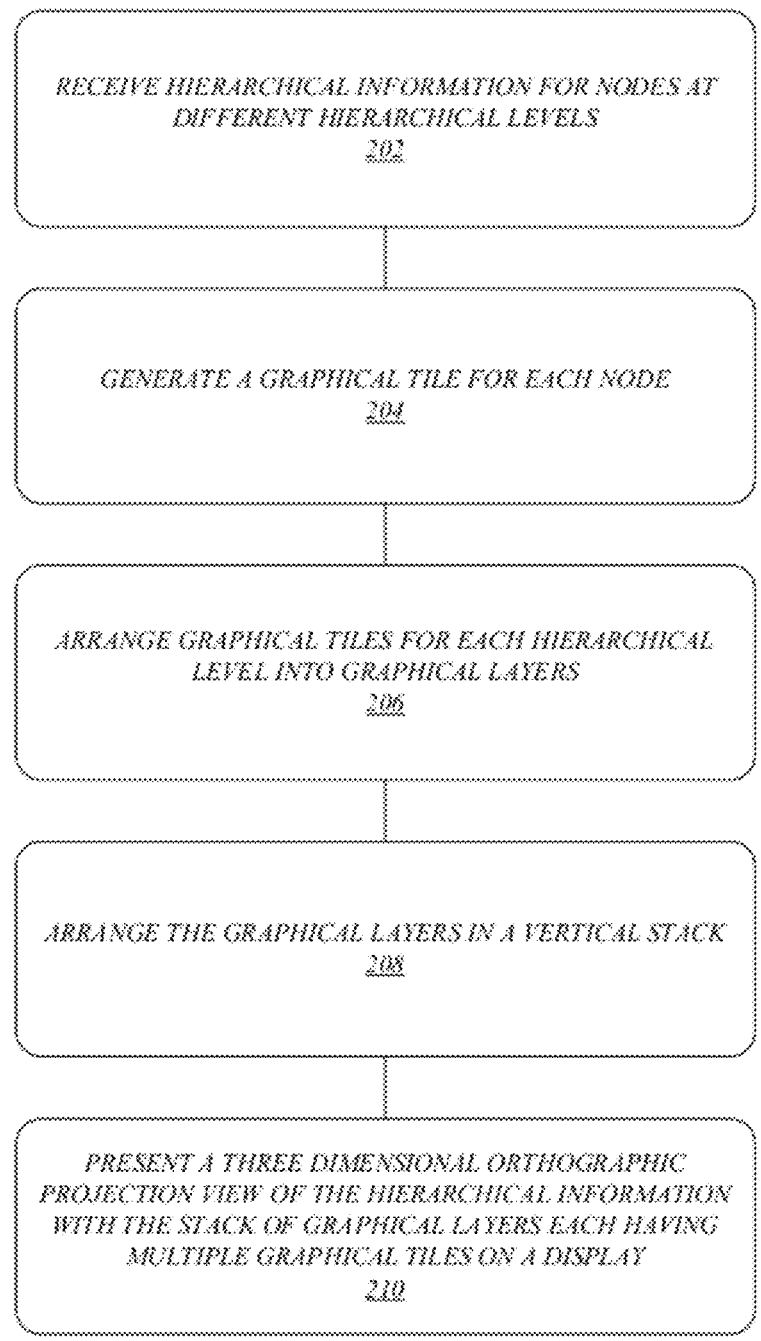
FIG. 2 illustrates an embodiment of a logic flow.

FIG. 2 illustrates one embodiment of a logic flow 200. The logic flow 200 may be representative of some or all of the operations executed by one or more embodiments described herein.

In the illustrated embodiment shown in FIG. 2, the logic flow 200 may receive hierarchical information for nodes at different hierarchical levels at block 202. For example, the hierarchical information component 122 may receive hierarchical information 110 for nodes at different hierarchical levels, and parse the hierarchical information 110 into a tree data structure.

The logic flow 200 may generate a graphical tile for each node at block 204. For example, the orthographic generator component 124 may generate a graphical tile for each node of the hierarchical information 110 stored in the tree data structure. The orthographic generator component 124 may generate graphical tiles in a rectangular geometry utilizing a given tile algorithm, such as a squarified algorithm, for example.

The logic flow 200 may arrange graphical tiles for each hierarchical level into graphical layers at block 206. For example, the orthographic generator component 124 may arrange one or more graphical tiles for each hierarchical level into graphical or planar layers. An example of a graphical layer may comprise a tree map structure, among others.

The logic flow 200 may arrange the graphical layers in a vertical stack at block 208. For example, the orthographic presentation component 126 may arrange the graphical layers in a vertical stack based on a defined order, from a top layer to a bottom layer along a vertical axis approximately perpendicular to a horizontal plane for a given layer.

The logic flow 200 may present a three dimensional orthographic projection view of the hierarchical information with the stack of graphical layers each having multiple graphical tiles on a display at block 210. For example, the orthographic presentation component 126 may present a three dimensional orthographic projection view of the hierarchical information 110 with the vertical stack of graphical layers each having multiple graphical tiles on a digital display for an electronic device.

Figure 3:
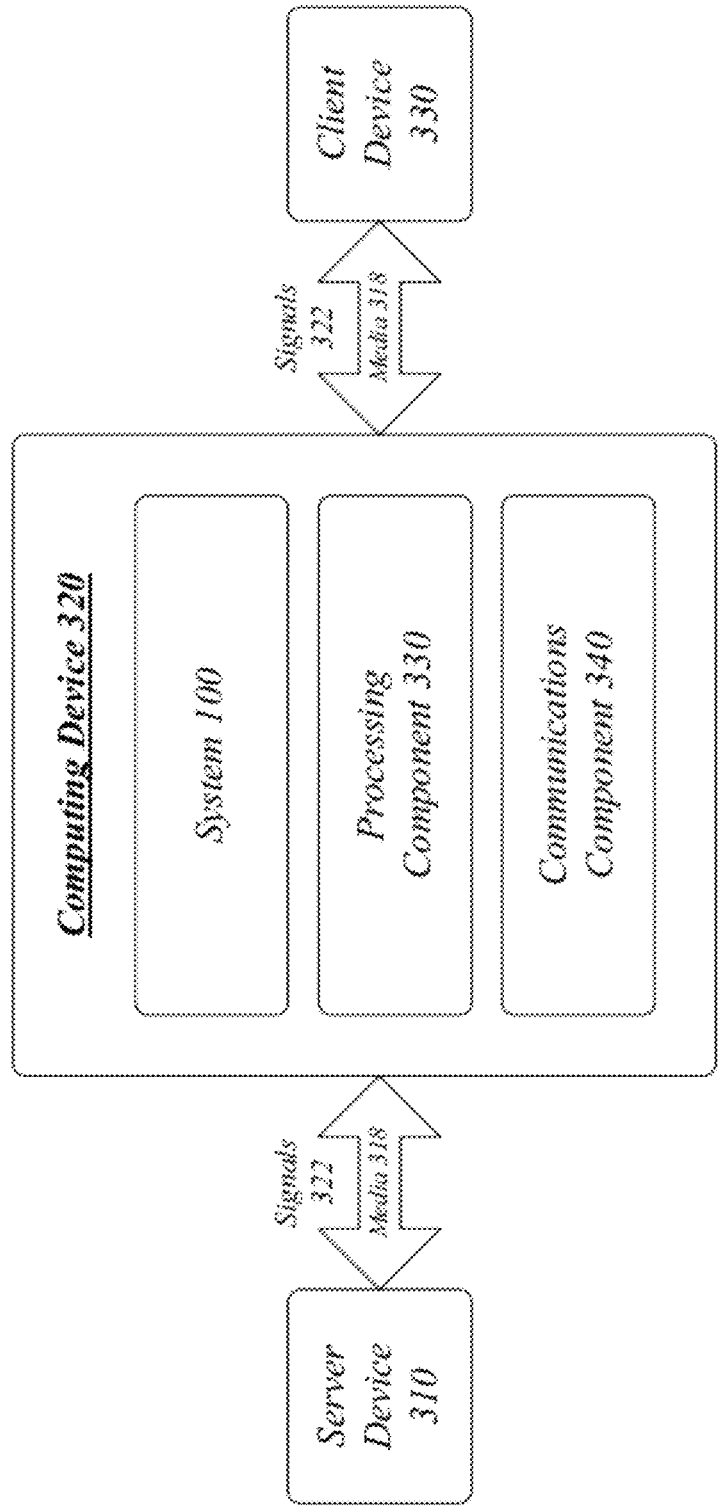
FIG. 3 illustrates an embodiment of a centralized system.

FIG. 3 illustrates a block diagram of a centralized system 300. The centralized system 300 may implement some or all of the structure and/or operations for the information management system 100 in a single computing entity, such as entirely within a single computing device 320.

The computing device 320 may execute processing operations or logic for the information management system 100 using a processing component 330. The processing component 330 may comprise various hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing device 320 may execute communications operations or logic for the information management system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 318 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 318.

The computing device 320 may communicate with other devices 310, 330 over a communications media 318 using communications signals 322 via the communications component 340. For example, the computing device 320 may receive hierarchical information 110 from a remote datastore implemented by a server device 310. In another example, a client device 330 may access the information management system 100 to generate and interact with an orthographic projection 140 via a client application, such as a web browser or client version of the information management system 100, for example.

Figure 4:
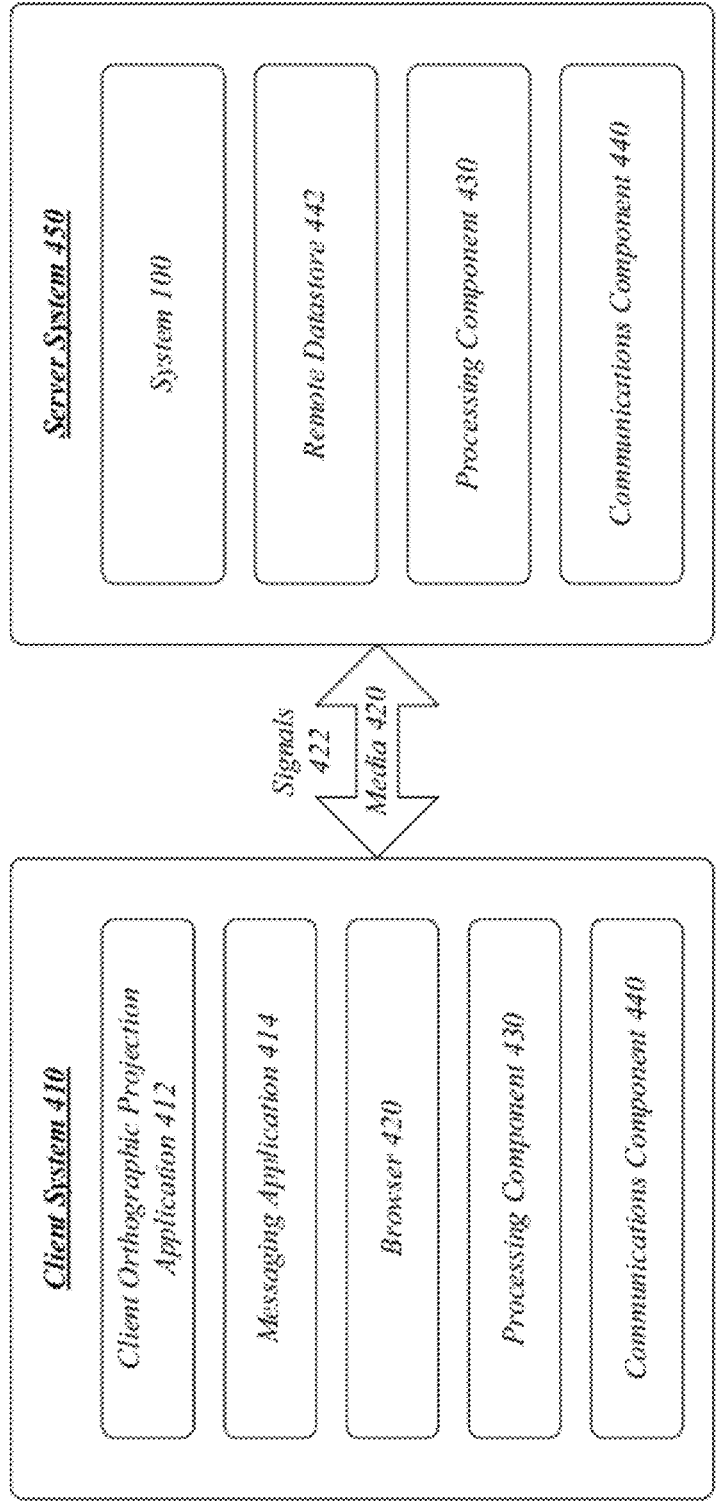
FIG. 4 illustrates an embodiment of a distributed system.

FIG. 4 illustrates a block diagram of a distributed system 400. The distributed system 400 may distribute portions of the structure and/or operations for the information management system 100 across multiple computing entities. Examples of distributed system 400 may include without limitation a client-server architecture, a 3-tier architecture, an N-tier architecture, a tightly-coupled or clustered architecture, a peer-to-peer architecture, a master-slave architecture, a shared daFtabase architecture, and other types of distributed systems. The embodiments are not limited in this context.

The client system 410 and the server system 450 may process information using the processing components 430, which are similar to the processing component 330 described with reference to FIG. 3. The client system 410 and the server system 450 may communicate with each over a communications media 420 using communications signals 422 via communications components 440, which are similar to the communications component 340 described with reference to FIG. 3.

In one embodiment, for example, the distributed system 400 may be implemented as a client-server system. A client system 410 may implement a client orthographic projection application 412, a messaging application 414, a web browser 420, a processing component 430 and a communications component 440. The client system 410 may optionally implement some or all of the information management system 100. A server system 450 may implement some or all of the information management system 100, a remote datastore 442, a processing component 430 and a communications component 440.

In various embodiments, the client system 410 may comprise or employ one or more client computing devices and/or client programs that operate to perform various methodologies in accordance with the described embodiments. For example, the client system 410 may implement a client orthographic projection application 412 implementing some or all components of the information management system 100. For example, the client system 410 may implement a client program specifically designed to interact with the information management system 100, such as an orthographic projection viewer, for example.

The client system 410 may further implement a messaging application 414 for managing incoming and outgoing messages, such as programs for providing unified messaging (UM) for e-mail, voicemail, voice over internet protocol (VoIP), instant messaging (IM), group IM, short message service (SMS), multimedia message service (MMS), enhanced presence, and audio-video conferencing, and/or other types of programs, applications, or services in accordance with the described embodiments. The client system 410 may use the messaging application 414 to receive an orthographic projection 140 object, video or images as message attachments, for example.

The client system 410 may also implement a web browser 420. The web browser 420 to allow a user to access the information management system 100 implemented by the server system 450. The web browser 420 may interact with the information management system 100 to send user control directives to the server system 450, and receive GUI views of an orthographic projection 140 from the server system 450.

In various embodiments, the server system 450 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 430 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs for managing incoming and outgoing messages, messaging server programs for providing unified messaging (UM) for e-mail, voicemail, VoIP, instant messaging (IM), group IM, SMS, MMS, enhanced presence, and audio-video conferencing, and/or other types of programs, applications, or services in accordance with the described embodiments.

Rather than implement the information management system 100, the server system 450 may implement a remote datastore 442 to store hierarchical information 110 for use by the client orthographic projection application 412. This would be advantageous when the hierarchical information 110 requires a larger or updated datastore relative to a local datastore implemented by the client system 410.

Figure 5:
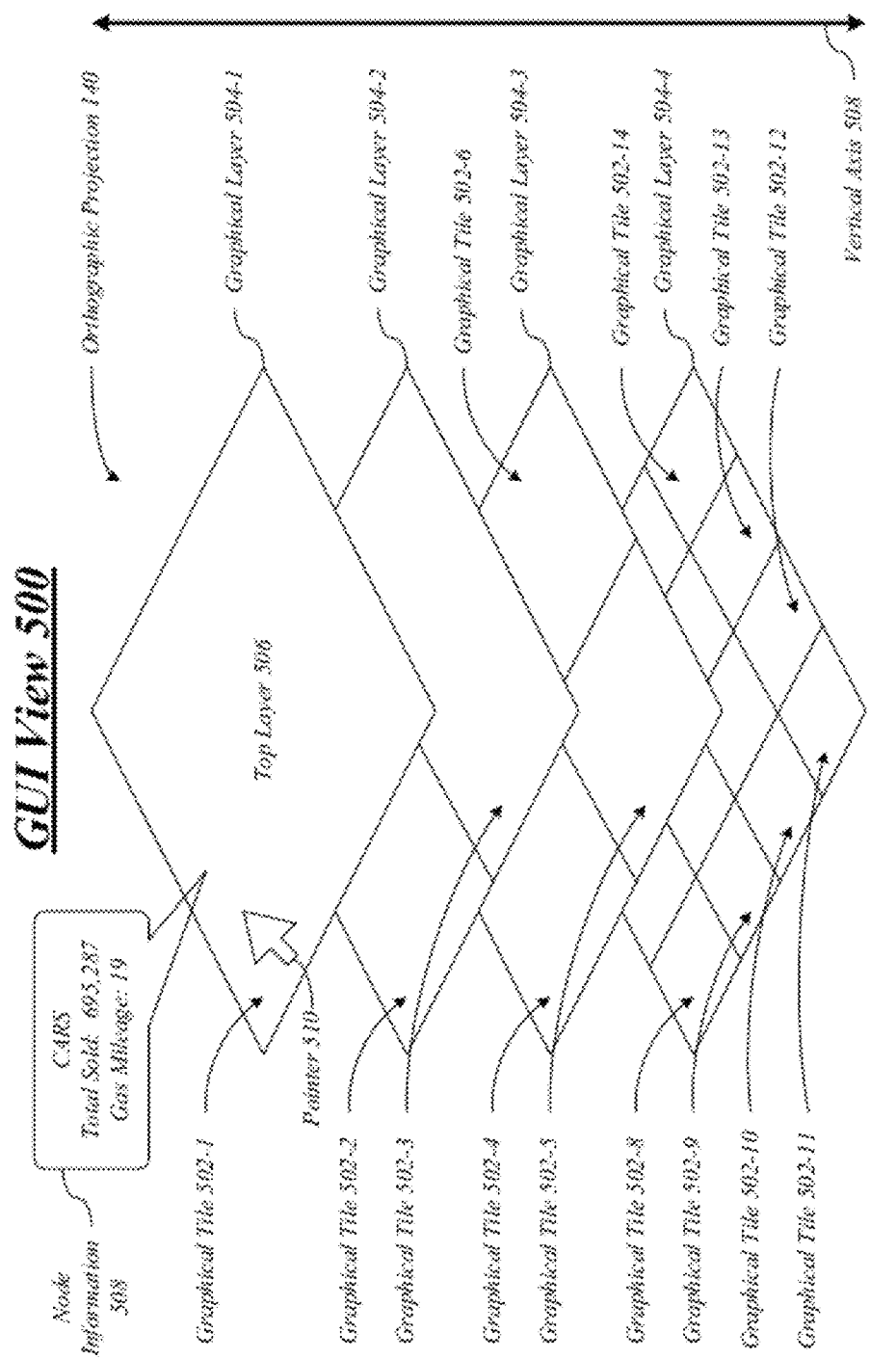
FIG. 5 illustrates an embodiment of a first GUI view.

FIG. 5 illustrates an embodiment of a GUI view 500. The GUI view 500 illustrates an exemplary GUI view of a model orthographic projection 140. The orthographic projection 140 may comprise graphical tiles 502-$a$ organized into multiple graphical layers 504-$b$ arranged into a vertical stack along a vertical axis 508. As illustrated by the GUI view 500, the orthographic projection 140 utilizes two dimensions to simulate a three dimensional view of the graphical tiles 502-$a$ and graphical layers 504-$b$.

It is worthy to note that "a" and "b" and "c" and similar designators as used herein are intended to be variables representing any positive integer. Thus, for example, if an implementation sets a value for a=5, then a complete set of graphical tiles 502-$a$ may include computing devices 502-1, 502-2, 502-3, 502-4 and 502-5. The embodiments are not limited in this context.

In the illustrated embodiment shown in FIG. 5, the GUI view 500 may comprise a graphical layer 504-1 comprising a single graphical tile 502-1. The graphical layer 504-1 may also comprise a top layer 506 of the vertical stack. The graphical layer 504-1 may comprise the graphical layer 504-1 representing a root node for the hierarchical information 110.

The GUI view 500 may further comprise a graphical layer 504-2 having two graphical tiles 502-2, 502-3. The graphical tiles 502-2, 502-3 may comprise children nodes of the root node, and the root node may comprise a parent node for these nodes. The graphical tiles 502-2, 502-3 may further represent nodes of a same hierarchical level since they are both one edge away from the root node represented as the graphical tile 502-1.

The GUI view 500 may further comprise a graphical layer 504-3 comprising graphical tiles 502-4, 502-5, 502-6 and 502-7, and a graphical layer 504-4 comprising graphical tiles 502-8 through 502-23. It is worthy to note that some graphical tiles, such as graphical tile 502-7 of the graphical layer 504-3 and graphical tiles 504-15 to 504-23 of the graphical layer 504-4, are hidden by higher graphical layers. In some embodiments, this may be corrected by implementing various graphical layers 504-$b$ with varying degrees of transparency or translucency, thereby allowing hidden graphical tiles to be viewed.

A user may manipulate and interact with the orthographic projection 140 utilizing various GUI tools, such as control buttons, pointers, text commands, and so forth. The pointer 510 provides an example of a GUI tool that can be used to manipulate the orthographic projection 140, although others may be used as well. Further examples are provided with reference to FIG. 9. Any conventional GUI tools for manipulating objects on a display may be used, however, and the embodiments are not limited in this context.

FIGS. 6-14 illustrate various GUI views resulting from manipulation of the orthographic projection 140. The GUI view 500 illustrates a result when selecting a top layer 506 using the pointer 510. The selection may include actually clicking on the top layer 506, or simply hovering the pointer 510 above the top layer 506. The GUI view 500 illustrates a case where the orthographic presentation component 126 presents node information 508 associated with the root node when the graphical tile 502-1 is selected via the pointer 510. For example, assuming the hierarchical information 110 is about cars sold in the United States, the node information 508 may present a title "CARS" for the hierarchical information 110, a total number of cars "695,287" sold in the United States, and an average gas mileage of "19" miles per gallon. It may be appreciated that the node information 508 may comprise any type of information associated with a given node, and the embodiments are not limited in this context.

Figure 6:
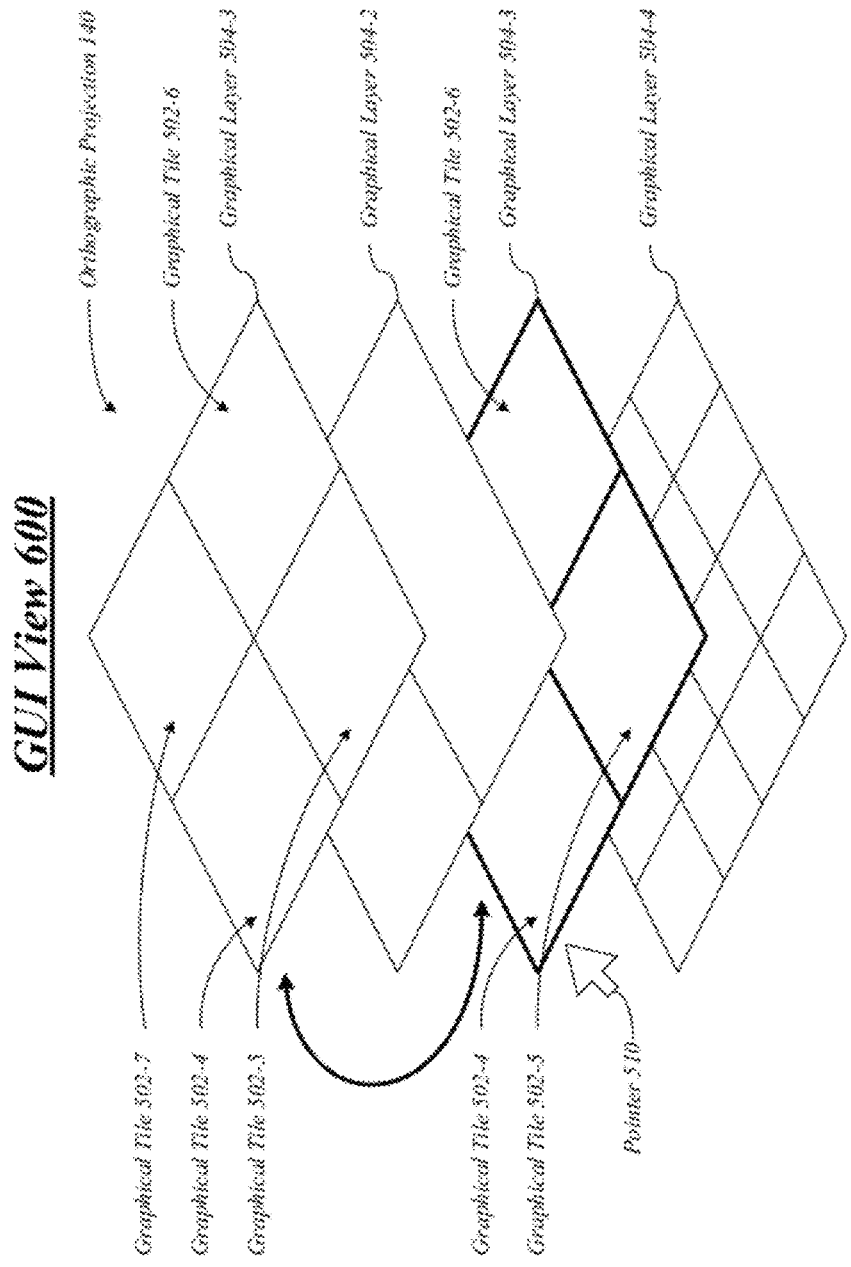
FIG. 6 illustrates an embodiment of a second GUI view.

FIG. 6 illustrates an embodiment of a GUI view 600. The orthographic projection 140 provides for direct layer navigation. In the orthographic projection 140, the graphical layers 504-$b$ are stacked vertically and so may be directly selected to allow a user to jump straight to that level in the hierarchy. The orthographic presentation component 126 may move a graphical layer 504-*b* to a top layer 506 of the vertical stack when selected by the pointer 510. As shown in the GUI view 600, a user may select the graphical layer 504-3, and the orthographic presentation component 126 may move the graphical layer 504-3 to the top layer 506.

Additionally, when implemented with some level of transparency, hovering over a particular graphical layer 504-*b* will cause it to temporarily gain focus and become visible. Once the graphical layer 504-*b* gains focus, the user could hover over the graphical layer 504-*b* and invoke tooltips across the graphical layer 504-*b*. In one embodiment, the focus will change only when the user hovers out of that graphical layer 504-*b*.

Figure 7:
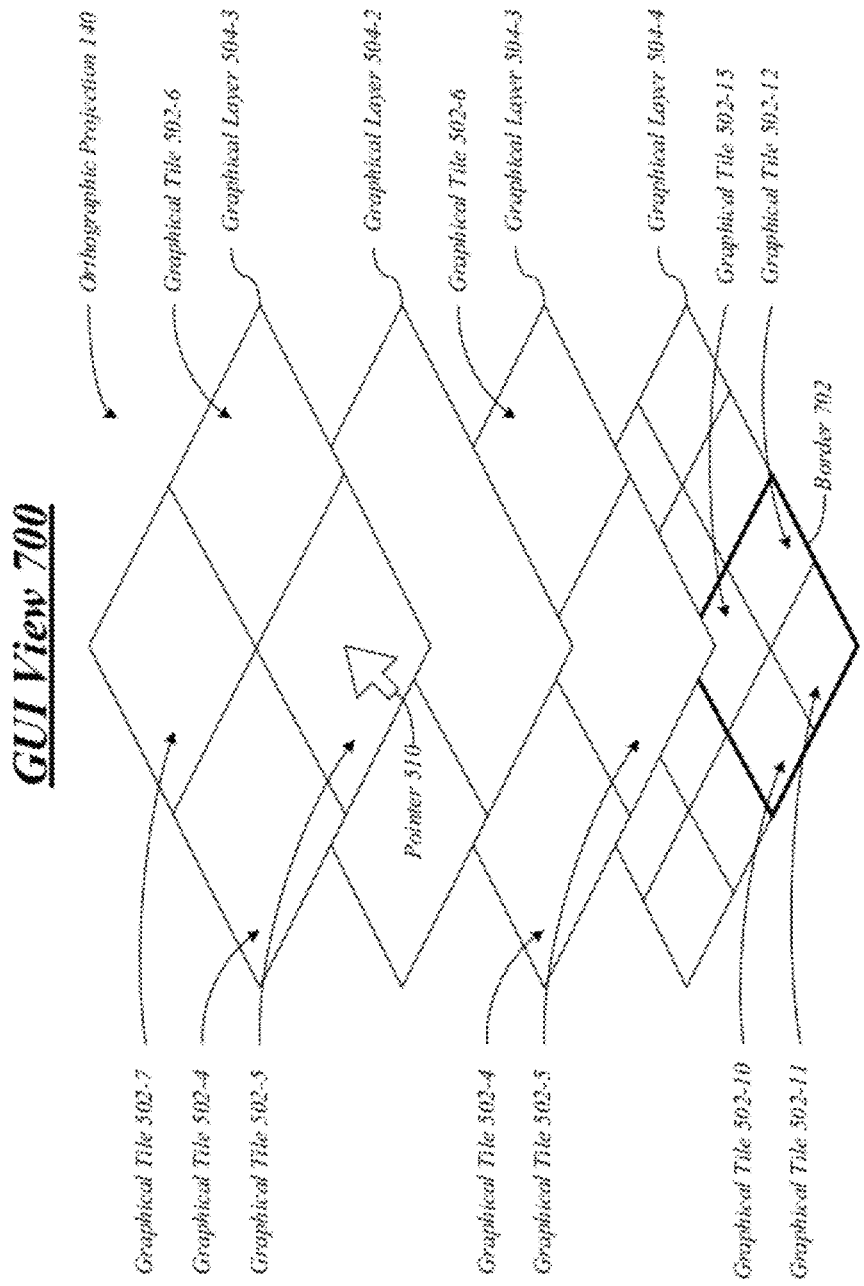
FIG. 7 illustrates an embodiment of a third GUI view.

FIG. 7 illustrates an embodiment of a GUI view 700. As shown in the GUI view 700, the orthographic presentation component 126 may modify a visual characteristic for any graphical tiles 502-*a* representing child nodes when a graphical tile 502-*a* for a parent node is selected. For example, when a user hovers the pointer 510 over the graphical tile 502-5 of the top layer 506 (representing the graphical layer 504-3), a border 702 may be drawn around graphical tiles 502-10, 502-11, 502-12 and 502-15 of the graphical layer 504-4 representing child nodes of the parent node represented by the graphical tile 502-5. Additionally or alternatively, the child nodes may be highlighted with a shadow effect, helping to explain the hierarchy and to cue what effect expanding graphical tile 502-5 will have on the top layer 506. Optionally, the entire graphical layer 504-4 that the child nodes are from may be given a darker outline to help highlight the graphical layer 504-4.

Figure 8:
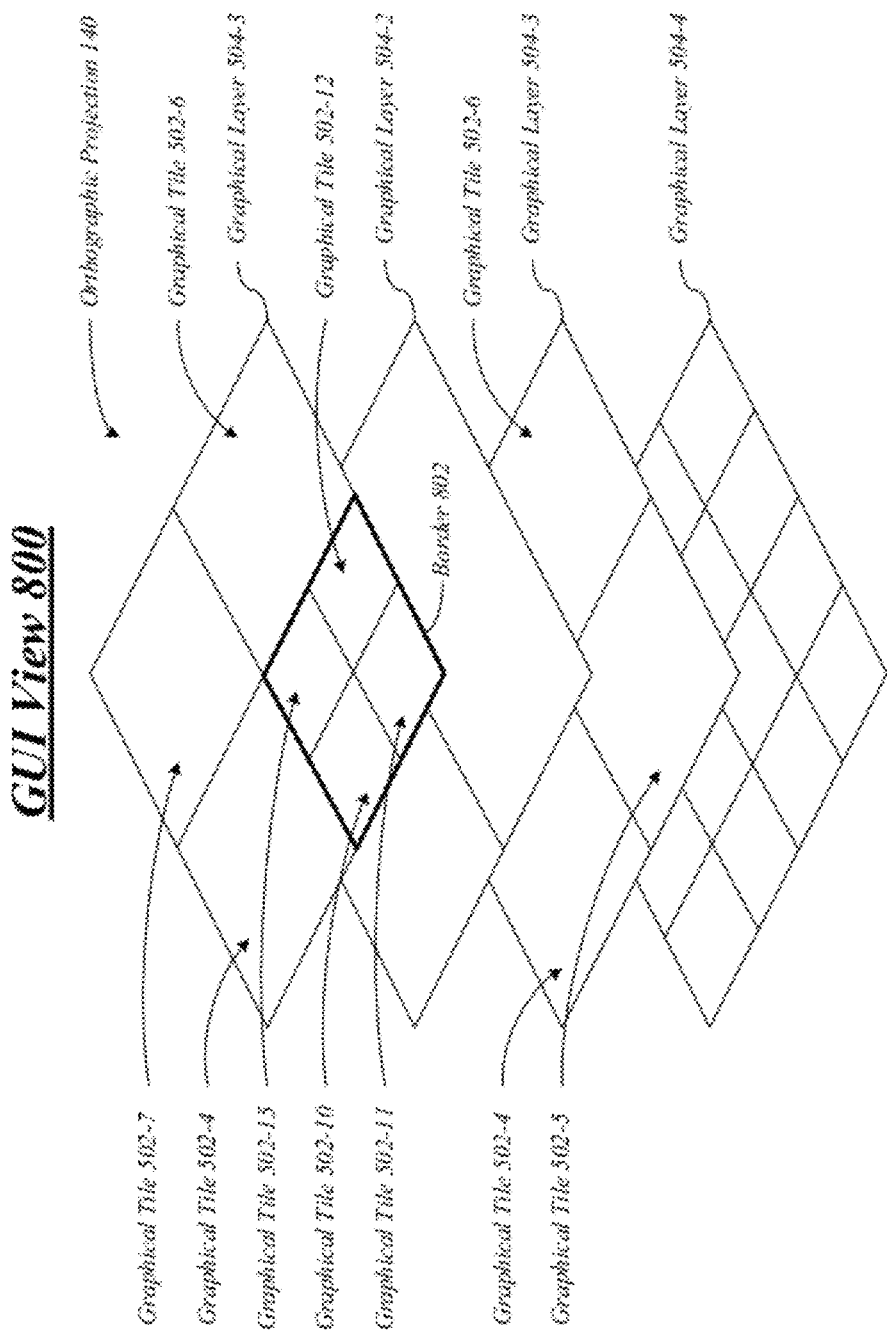
FIG. 8 illustrates an embodiment of a fourth GUI view.

FIG. 8 illustrates an embodiment of a GUI view 800. As shown in the GUI view 800, the orthographic presentation component 126 may move a first set of graphical tiles 502-*a* from a graphical layer 504-*b* to a top layer 506 of the vertical stack when the graphical tiles 502-*a* are selected. Returning to the previous example as described with reference to the GUI view 700 as shown in FIG. 7, assume a user selects the graphical tile 502-5. The orthographic presentation component 126 may surface the graphical tiles 502-10, 502-11, 502-12 and 502-15 from the graphical layer 504-4 to the top layer 506 of the vertical stack when the graphical tile 502-5 is selected by the pointer 510. This allows a viewer to have a clearer view of the graphical tiles 502-10, 502-11, 502-12 and 502-15.

Once surfacing operations occur, the top layer 506 may include a mix of different graphical tiles 502-*a* from different graphical layers 504-*b*. The orthographic presentation component 126 may generate a visual cue, such as border 802, around a set of graphical tiles 502-*a* when presented in the top layer 506. For instance, the GUI view 800 illustrates the top layer 506 having the graphical tiles 502-4, 502-6 and 502-7 from the graphical layer 504-3, and the graphical tiles 502-10, 502-11, 502-12 and 502-15 from the graphical layer 504-4. To assist a viewer in visually separating graphical tiles 502-*a* from different graphical layers 504-*b*, the orthographic presentation component 126 may use visual cues such as drawing a border 802 around graphical tiles 502-*a* from the same graphical level 504-*b*. Further, the shade of the border 802 may be darkened in proportion to how deep in the hierarchy the graphical tile 502-*a* is surfaced from, and the border 802 is drawn so as to minimize the amount of space dedicated to them.

Figure 9:
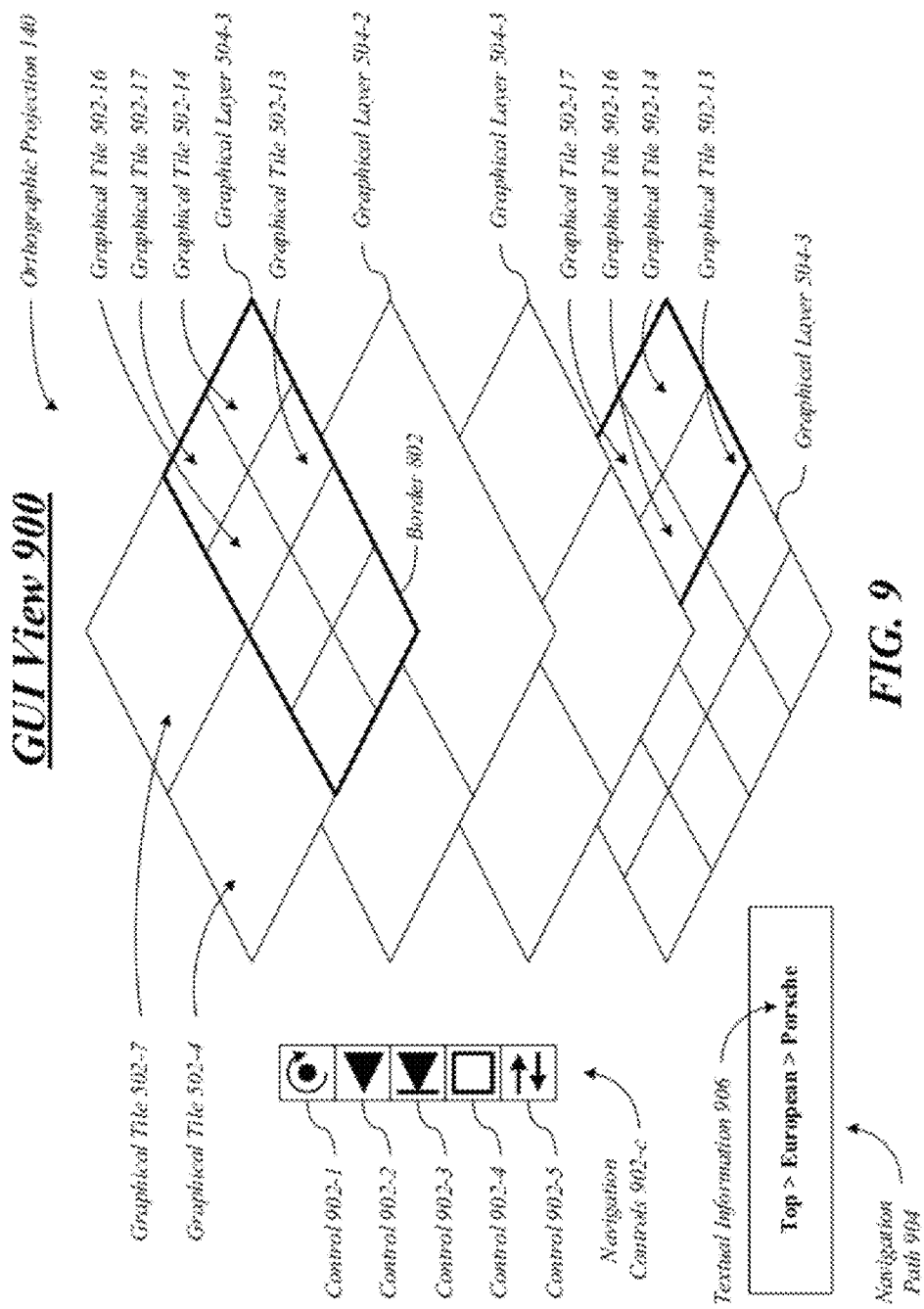
FIG. 9 illustrates an embodiment of a fifth GUI view.

FIG. 9 illustrates an embodiment of a GUI view 900. The GUI view 900 provides an example of when multiple sets of graphical tiles 502-*a* are surfaced from a graphical layer 504-*b* to the top layer 506. Continuing with the previous example shown by the GUI view 800 as described with reference to FIG. 8, assume a user selects the graphical tile 502-6 of the graphical layer 504-3 as shown in the top layer 506. The orthographic presentation component 126 may surface the graphical nodes 502-13, 502-14, 502-16 and 502-17 representing child nodes for the parent node represented by the graphical node 502-6 in the top layer 506. When this occurs, the orthographic presentation component 126 may expand the border 802 around the graphical tiles 502-0, 502-11, 502-12, 502-13, 502-14, 502-15, 502-16 and 502-17 when presented in the top layer 506.

The orthographic projection application 120 may include a navigation component 128 to provide different GUI controls to allow a user to interact and navigate through the various features offered by an orthographic projection 140. The GUI view 900 shows a few examples of GUI controls designed to interact with the navigation component 128, including a set of navigation controls 902-*c* and a navigation path 904.

The GUI view 900 illustrates a set of navigation controls 902-*c*. The navigation controls 902-*c* may allow a user to control various aspects of an orthographic projection 140. In one embodiment, for example, a navigation control 902-1 may control a rotation feature for an orthographic projection 140. A navigation control 902-2 may control an undo feature for an orthographic projection 140. A user can use the navigation control 902-2 to undo a previous operation or set of operations. Since a user is not performing any form of modification to the underlying data, the undo feature may be used in the context of allowing the user to take steps backward after they have zoomed or expanded graphical tiles 502-*a* in a graphical layer 504-*b*. This allows a user to feel confident when manipulating a view since they can undo any changes to return to a stable state. A navigation control 902-3 may control a reset feature for an orthographic projection 140. A user can use the navigation control 902-3 to reset an orthographic projection 140 to its original or initial viewing state (e.g., the GUI view 500). A navigation control 902-4 may control switching or toggling between a two dimensional view and a three dimensional view for an orthographic projection 140. A navigation control 902-5 may control switching between a two dimensional flat view and a different graphical chart. It may be appreciated that other navigation controls 902-*c* may be used for a given implementation.

The GUI view 900 further illustrates a navigation path 904. The navigation path 904 presents textual information 906 illustrating a series of navigation operations leading to a given graphical tile 502-*a* when the graphical tile 502-*a* is selected. Since the orthographic projection 140 supports multiple navigation techniques, the path 904 serves multiple purposes. It shows the path 904 to the graphical tile 502-*a* the user is currently hovering the pointer 510 over, it shows the trail of graphical tiles 502-*a* that were zoomed in on assuming any zooms have been performed, and it allows the user to click on locked elements in the path 904 to return to viewing a higher level, thereby performing operations similar to a zoom out operation.

Figure 10:
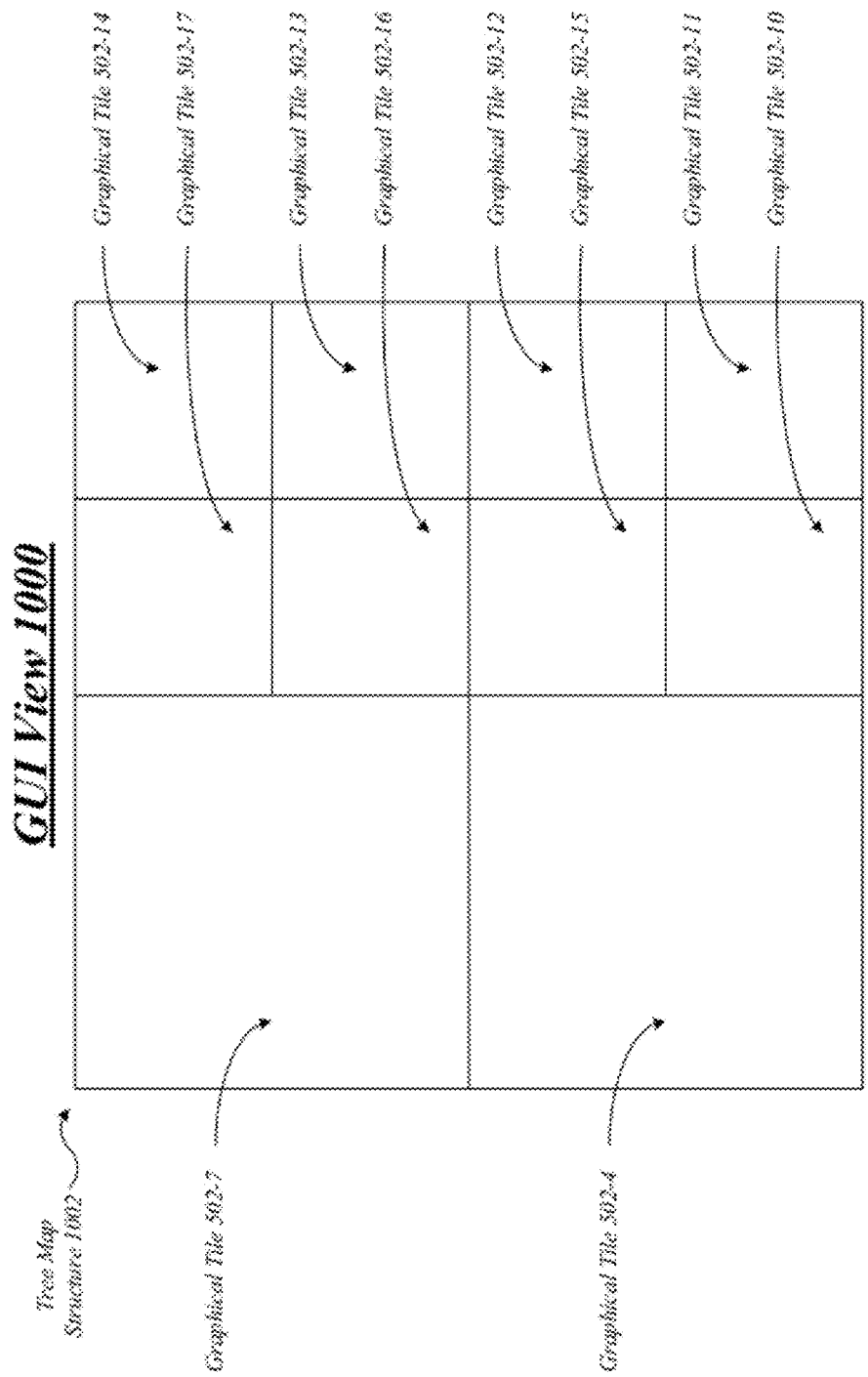
FIG. 10 illustrates an embodiment of a sixth GUI view.

FIG. 10 illustrates an embodiment of a GUI view 1000. The navigation component 128 may switch a graphical layer 504-*b* between a three dimensional orthographic projection view and a two dimensional view when the navigation control 902-4 is selected. Once a user surfaces a graphical layer 504-*b* of interest to the top layer 506, or some combination of graphical tiles 502-*a* from different graphical layers 504-*b*, a user may desire to view the top layer 506 in a two dimensional view. GUI view 1000 illustrates a case where the top layer 506 shown by the GUI view 900, which includes a combination of graphical tiles 502-4, 502-7 from the graphical layer 504-3 and graphical tiles 502-10, 502-11, 502-12, 502-13, 502-14, 502-15, 502-16 and 502-17 from the graphical layer 504-4, is switched between a three dimensional orthographic view to a two dimensional flat view. When in the top layer 506 is shown in a two dimensional flat view, it appears as a tree map structure 1002. The GUI view 1000 may be toggled back to a three dimensional orthographic view (e.g., as shown by the GUI view 900) by selecting the navigation control 902-4.

To enhance a visual experience for a viewer, the animation component 130 may animate transitions between a three dimensional orthographic projection view and a two dimensional flat view. The animation component 130 may implement space-filling visualizations to smoothly animate transitions between GUI views. The animation may assist a user in relating two states of the information management system 100.

Navigation operations may be performed on a two dimensional orthographic view similar to those available for a conventional tree map structure. Any navigation operations performed while in the two dimensional flat view will be replicated to a three dimensional orthographic view. For instance, if a user were to rotate a two dimensional flat view of a top layer 506 around a central axis, a three dimensional orthographic view of the top layer 506 will be shown with the same rotation. This allows a user to maintain visual orientation when switching between two dimensional and three dimensional views.

Figure 11:
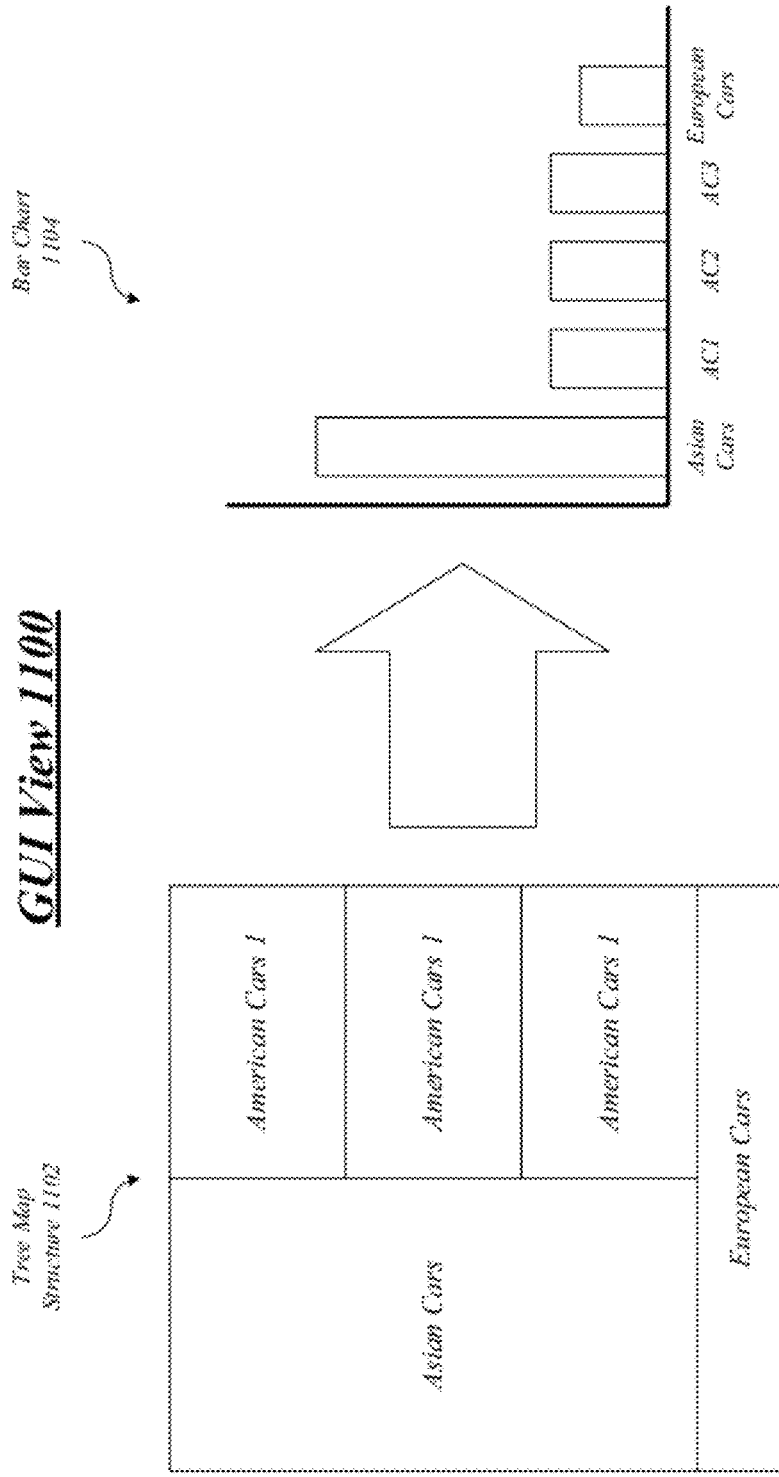
FIG. 11 illustrates an embodiment of a seventh GUI view.

FIG. 11 illustrates an embodiment of a GUI view 1100. The GUI view 1100 illustrates an example when the orthographic presentation component 126 may generate a graphical chart for a set of graphical tiles 502-a or a graphical layer 504-b when the set of graphical tiles 502-a or graphical layer 504-b is selected as a top layer 506. Comparison of graphical tiles 502-a can be difficult when they are similar or there are many graphical tiles 502-a to compare. To facilitate comparisons, the desired graphical tiles 502-a could be selected and used to create a new graphical chart or table. This concept is extendable to all graph types that can support selection. Alternately, the user could choose to select and convert an entire graphical layer 504-b, including the top layer 506, to a different kind of visualization that may be a graphical table or a chart.

For instance, assume a user activates the navigation control 902-5 arranged to control switching between a two dimensional flat view and a different graphical chart. When activated, the orthographic presentation component 126 may convert a two dimensional flat view of a tree map structure 1102, which corresponds to a top layer 506 of an orthographic projection 140, to a graphical chart of any type. In the illustrated embodiment shown in the GUI view 1100 of FIG. 11, the tree map structure 1102 is converted to a bar chart 1104. However, any type of graphical chart may be used as desired for a given implementation.

Figure 12:
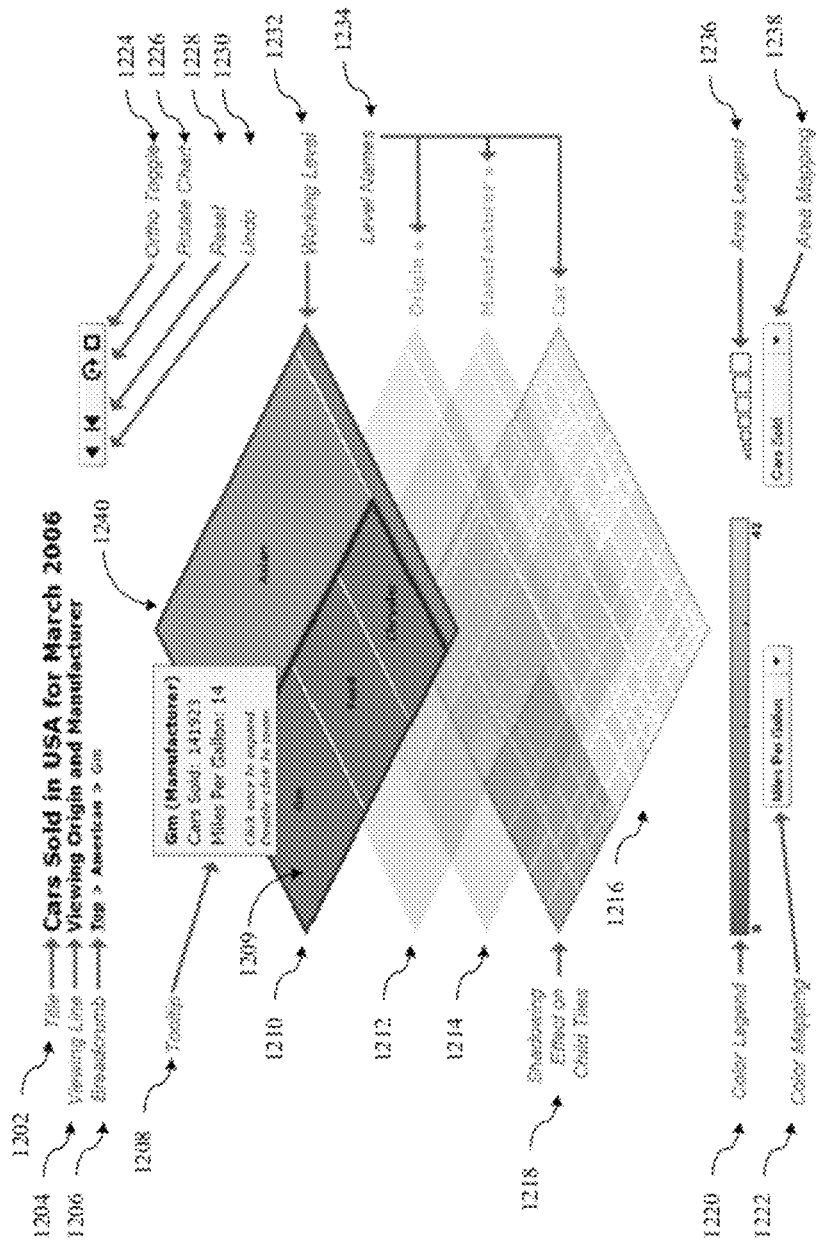
FIG. 12 illustrates an embodiment of an eighth GUI view.

FIG. 12 illustrates an embodiment of a GUI view 1200. The GUI view 1200 illustrates a specific implementation of an orthographic projection 1240 having multiple graphical layers 1210, 1212, 1214 and 1216, each having multiple graphical tiles 502-a. The GUI view 1200 may illustrate a specific set of exemplary GUI elements that may be used when implementing a GUI view of an orthographic projection 1240.

As shown, the GUI view may include a title 1202, a viewing line 1204, and a breadcrumb 1206. The breadcrumb 1206 may represent an implementation for a navigation path 904 and textual information 906, for example. The GUI view 1200 may also illustrate a tooltip 1208 when a pointer 510 hovers over a graphical tile 1209. The GUI view 1200 may further illustrate a shadowing effect on graphical tiles 502-a representing various child nodes for the graphical tile 1209 when a pointer 510 hovers over the graphical tile 1209. The GUI view 1200 also includes a color legend 1220 and a color mapping 1222. The use of colors may help visualize different dimensions for a given graphical tile 502-a. The GUI view 1200 illustrates examples of navigation controls 902-c, including a orthographic toggle control 1224, a rotate chart control 1226, a reset control 1228 and an undo control 1230. The GUI view 1200 illustrates level names 1234 that may be associated with each graphical layer 1210, 1212, 1214 and 1216, which makes it easier for a user to select a graphical layer for closer inspection. The GUI view 1200 illustrates an area legend 1236 and an area mapping 1238, to give a user a sense of a particular dimension represented by a size for a given graphical tile. For instance, in its current configuration, smaller rectangles for graphical tiles represent a lower number of cars sold, while larger rectangles represent a higher number of cars sold.

Figure 13:
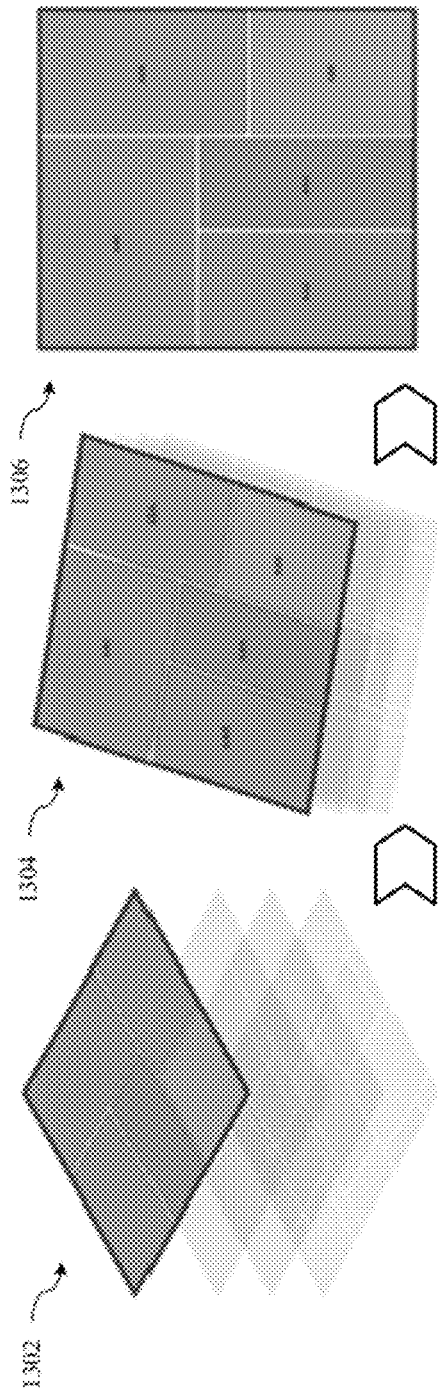
FIG. 13 illustrates an embodiment of a ninth GUI view.

FIG. 13 illustrates an embodiment of a GUI view 1300. The GUI view 1300 illustrates an example of the animation component 130 animating transitions between a three dimensional orthographic projection view 1302 and a two dimensional flat view 1306 to enhance a visual experience for a viewer. The animation component 130 may implement space-filling visualizations to smoothly animate transitions between GUI views. As shown in the GUI view 1300, a graphical layer 504-b may be switched from a three dimensional orthographic projection view 1302 to a two dimensional flat view 1306 via one or more intermediate views 1304. The intermediate view 1304 fills space between the visual states shown by the views 1302, 1306. It may be appreciated that there may be any number of intermediate views 1304 used by the animation component 130 depending on a level of smoothness and time constraints desired for a given implementation.

Figure 14:
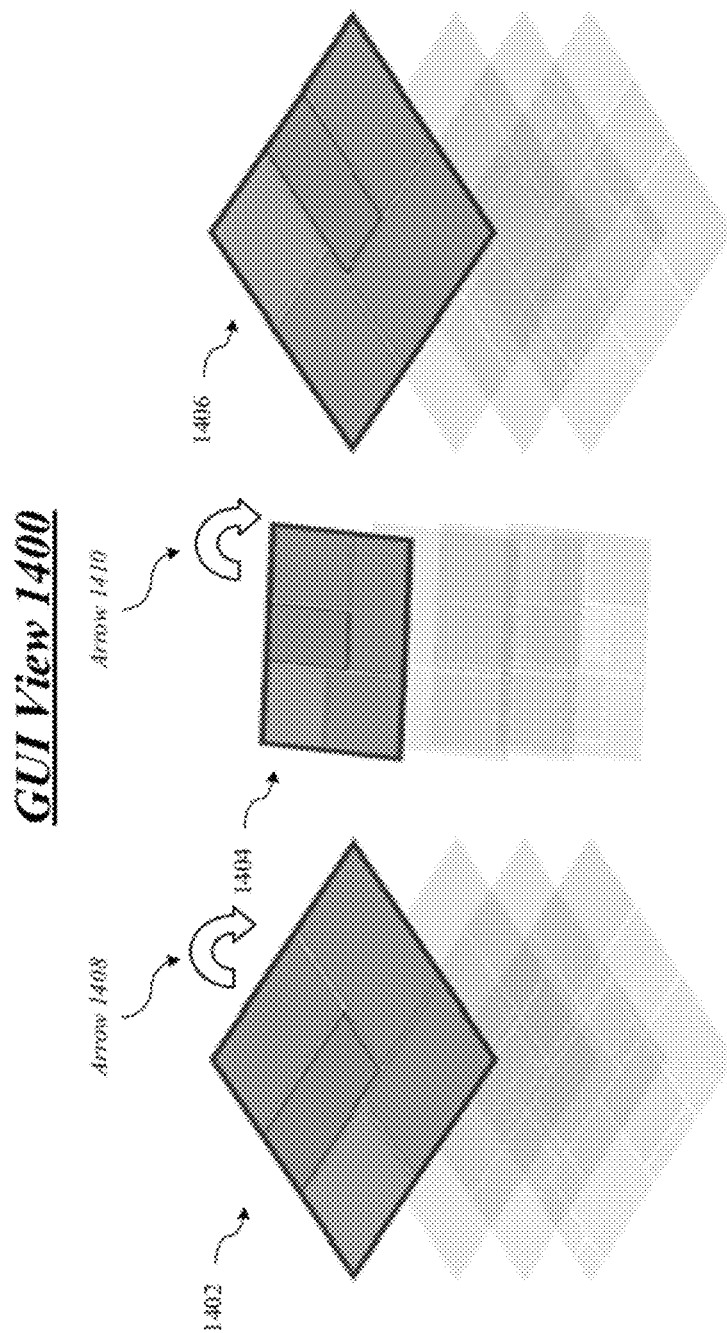
FIG. 14 illustrates an embodiment of a tenth GUI view.

FIG. 14 illustrates an embodiment of a GUI view 1400. The GUI view 1400 illustrates an example of the animation component 130 animating a transition between different three dimensional orthographic projection views 1402, 140-6. Assume a user activates the navigation control 902-1 to control a rotation feature for an orthographic projection 140. The animation component 130 may implement space-filling visualizations to smoothly animate transitions between GUI views. As shown in the GUI view 1400, a graphical layer 504-b may be switched from a three dimensional orthographic projection view 1402 to a rotated three dimensional orthographic view 1406 via one or more intermediate views 1404. A direction of rotation is shown by arrows 1408, 1410. The intermediate view 1404 fills space between the visual states shown by the views 1402, 1406. It may be appreciated that there may be any number of intermediate views 1404 used by the animation component 130 depending on a level of smoothness and time constraints desired for a given implementation.

Figure 15:
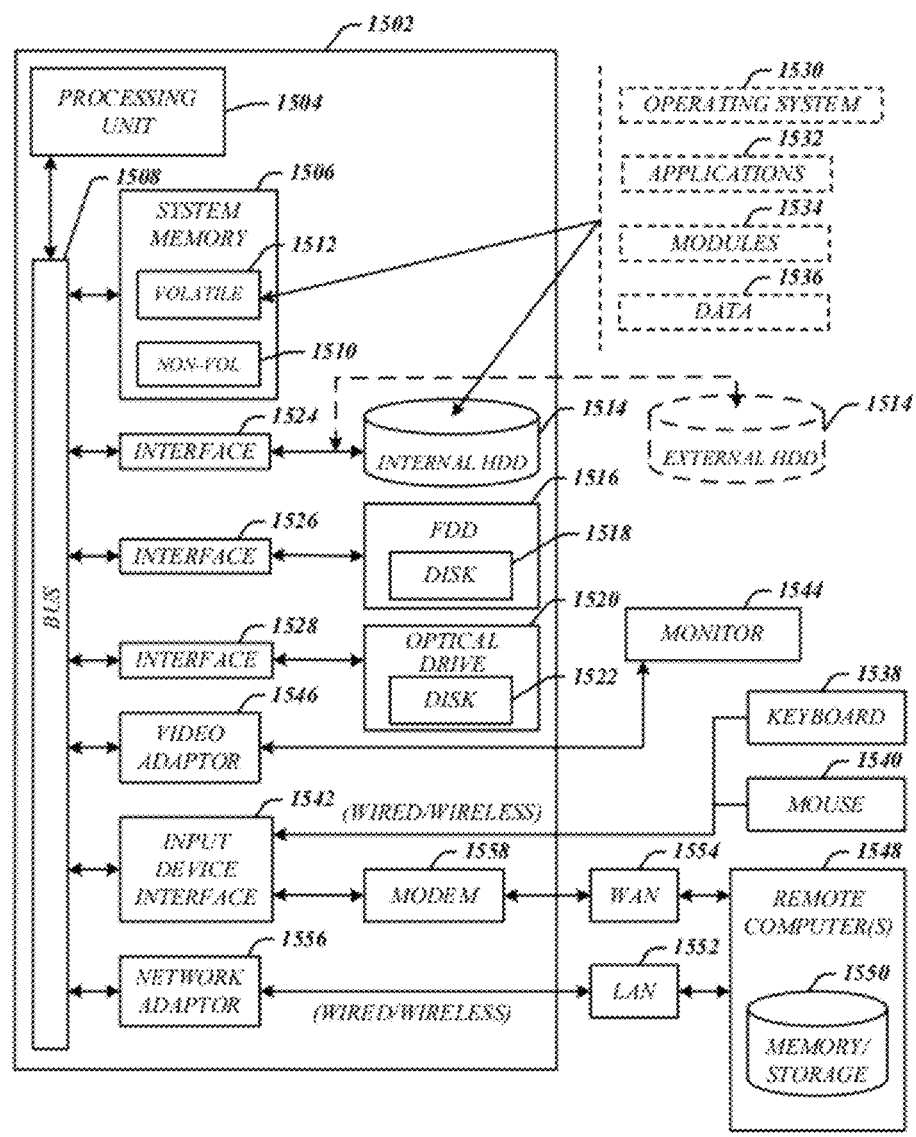
FIG. 15 illustrates an embodiment of a computing architecture.

FIG. 15 illustrates an embodiment of an exemplary computing architecture 1500 suitable for implementing various embodiments as previously described. As used in this application, the terms "system" and "component" are intended to refer to a computer-related entity, either hardware, a combination of hardware and software, software, or software in execution, examples of which are provided by the exemplary computing architecture 1500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1500 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1500 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1500.

As shown in FIG. 15, the computing architecture 1500 comprises a processing unit 1504, a system memory 1506 and a system bus 1508. The processing unit 1504 can be any of various commercially available processors. Dual microprocessors and other multi-processor architectures may also be employed as the processing unit 1504. The system bus 1508 provides an interface for system components including, but not limited to, the system memory 1506 to the processing unit 1504. The system bus 1508 can be any of several types of bus structure that may further interconnect to a memory bus (with or without a memory controller), a peripheral bus, and a local bus using any of a variety of commercially available bus architectures.

The computing architecture 1500 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like.

The system memory 1506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 15, the system memory 1506 can include non-volatile memory 1510 and/or volatile memory 1512. A basic input/output system (BIOS) can be stored in the non-volatile memory 1510.

The computer 1502 may include various types of computer-readable storage media in the form of one or more lower speed memory units, including an internal hard disk drive (HDD) 1514, a magnetic floppy disk drive (FDD) 1516 to read from or write to a removable magnetic disk 1518, and an optical disk drive 1520 to read from or write to a removable optical disk 1522 (e.g., a CD-ROM or DVD). The HDD 1514, FDD 1516 and optical disk drive 1520 can be connected to the system bus 1508 by a HDD interface 1524, an FDD interface 1526 and an optical drive interface 1528, respectively. The HDD interface 1524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1510, 1512, including an operating system 1530, one or more application programs 1532, other program modules 1534, and program data 1536.

The one or more application programs 1532, other program modules 1534, and program data 1536 can include, for example, the orthographic projection application 120, the hierarchical information component 122, the orthographic generator component 124, the orthographic presentation component 126, the navigation component 128, the animation component 130, and so forth.

A user can enter commands and information into the computer 1502 through one or more wire/wireless input devices, for example, a keyboard 1538 and a pointing device, such as a mouse 1540. Other input devices may include a microphone, an infra-red (IR) remote control, a joystick, a game pad, a stylus pen, touch screen, or the like. These and other input devices are often connected to the processing unit 1504 through an input device interface 1542 that is coupled to the system bus 1508, but can be connected by other interfaces such as a parallel port, IEEE 1394 serial port, a game port, a USB port, an IR interface, and so forth.

A monitor 1544 or other type of display device is also connected to the system bus 1508 via an interface, such as a video adaptor 1546. In addition to the monitor 1544, a computer typically includes other peripheral output devices, such as speakers, printers, and so forth.

The computer 1502 may operate in a networked environment using logical connections via wire and/or wireless communications to one or more remote computers, such as a remote computer 1548. The remote computer 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wire/wireless connectivity to a local area network (LAN) 1552 and/or larger networks, for example, a wide area network (WAN) 1554. Such LAN and WAN networking environments are commonplace in offices and companies, and facilitate enterprise-wide computer networks, such as intranets, all of which may connect to a global communications network, for example, the Internet.

When used in a LAN networking environment, the computer 1502 is connected to the LAN 1552 through a wire and/or wireless communication network interface or adaptor 1556. The adaptor 1556 can facilitate wire and/or wireless communications to the LAN 1552, which may also include a wireless access point disposed thereon for communicating with the wireless functionality of the adaptor 1556.

When used in a WAN networking environment, the computer 1502 can include a modem 1558, or is connected to a communications server on the WAN 1554, or has other means for establishing communications over the WAN 1554, such as by way of the Internet. The modem 1558, which can be internal or external and a wire and/or wireless device, connects to the system bus 1508 via the input device interface 1542. In a networked environment, program modules depicted relative to the computer 1502, or portions thereof, can be stored in the remote memory/storage device 1550. It will be appreciated that the network connections shown are exemplary and other means of establishing a communications link between the computers can be used.

The computer 1502 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 16:
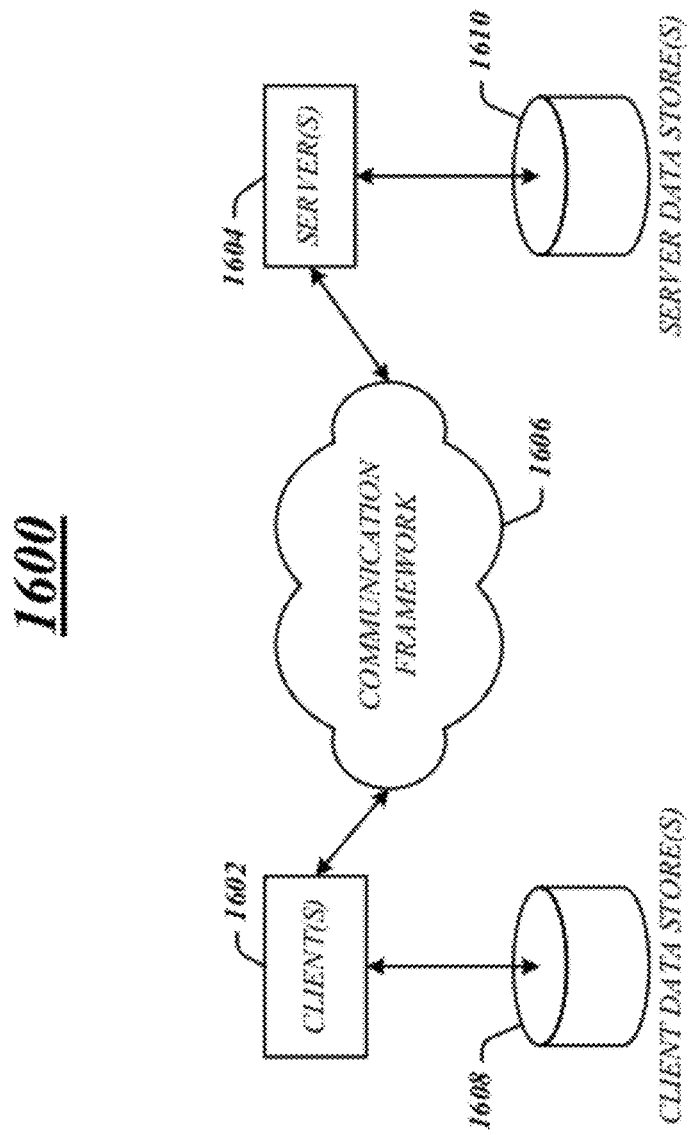
FIG. 16 illustrates an embodiment of a communications architecture.

FIG. 16 illustrates a block diagram of an exemplary communications architecture 1600 suitable for implementing various embodiments as previously described. The communications architecture 1600 includes various common communications elements, such as a transmitter, receiver, transceiver, radio, network interface, baseband processor, antenna, amplifiers, filters, and so forth. The embodiments, however, are not limited to implementation by the communications architecture 1600.

As shown in FIG. 16, the communications architecture 1600 comprises includes one or more clients 1602 and servers 1604. The clients 1602 may implement the client systems 310, 400. The servers 1604 may implement the server system 330. The clients 1602 and the servers 1604 are operatively connected to one or more respective client data stores 1608 and server data stores 1610 that can be employed to store information local to the respective clients 1602 and servers 1604, such as cookies and/or associated contextual information.

The clients 1602 and the servers 1604 may communicate information between each other using a communication framework 1606. The communications framework 1606 may implement any well-known communications techniques and protocols, such as those described with reference to systems 300, 400 and 1500. The communications framework 1606 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-implemented method, comprising:
receiving hierarchical information for nodes at different hierarchical levels;
generating a graphical tile for each node;
arranging graphical tiles for each hierarchical level into graphical layers;
arranging the graphical layers in a vertical stack;
presenting, in a user interface, a three dimensional orthographic projection view of the stack of graphical layers, wherein the stack of graphical layers each has multiple graphical tiles on a display; and moving a graphical layer to a top layer of the vertical stack when selected.

2. The computer-implemented method of claim 1, comprising presenting node information when a graphical tile is selected.

3. The computer-implemented method of claim 1, comprising modifying a visual characteristic for graphical tiles representing child nodes when a graphical tile for a parent node is selected.

4. The computer-implemented method of claim 3, comprising generating a border around the first set of graphical tiles when presented in the top layer.

5. The computer-implemented method of claim 1, comprising presenting textual information for a path to a graphical tile when the graphical tile is selected.

6. The computer-implemented method of claim 1, comprising generating a graphical chart for a set of graphical tiles or a graphical layer when the set of graphical tiles or graphical layer is selected.

7. The computer-implemented method of claim 1, comprising presenting different graphical tiles representing a same numerical attribute with a same size area within each graphical layer.

8. A computer-implemented method, comprising:
receiving hierarchical information for nodes at different hierarchical levels;
generating a graphical tile for each node;
arranging graphical tiles for each hierarchical level into graphical layers;
arranging the graphical layers in a vertical stack;
presenting, in a user interface, a three dimensional orthographic projection view of the stack of graphical layers, wherein the stack of graphical layers each has multiple graphical tiles on a display; and
moving a first set of graphical tiles from a graphical layer to a top layer of the vertical stack when the graphical tiles are selected.

9. The computer-implemented method of claim 8, comprising presenting node information when a graphical tile is selected.

10. The computer-implemented method of claim 8, comprising modifying a visual characteristic for graphical tiles representing child nodes when a graphical tile for a parent node is selected.

11. The computer-implemented method of claim 10, comprising generating a border around the first set of graphical tiles when presented in the top layer.

12. The computer-implemented method of claim 8, comprising presenting textual information for a path to a graphical tile when the graphical tile is selected.

13. The computer-implemented method of claim 8, comprising generating a graphical chart for a set of graphical tiles or a graphical layer when the set of graphical tiles or graphical layer is selected.

14. The computer-implemented method of claim 8, comprising presenting different graphical tiles representing a same numerical attribute with a same size area within each graphical layer.

15. A computer-implemented method, comprising:
receiving hierarchical information for nodes at different hierarchical levels;
generating a graphical tile for each node;
arranging graphical tiles for each hierarchical level into graphical layers;
arranging the graphical layers in a vertical stack;
presenting, in a user interface, a three dimensional orthographic projection view of the stack of graphical layers, wherein the stack of graphical layers each has multiple graphical tiles on a display; and
switching a graphical layer between the three dimensional orthographic projection view and a two dimensional view.

16. The computer-implemented method of claim 15, comprising presenting node information when a graphical tile is selected.

17. The computer-implemented method of claim 15, comprising modifying a visual characteristic for graphical tiles representing child nodes when a graphical tile for a parent node is selected.

18. The computer-implemented method of claim 17, comprising generating a border around a first set of graphical tiles when presented in a top layer.

19. The computer-implemented method of claim 15, comprising presenting textual information for a path to a graphical tile when the graphical tile is selected.

20. The computer-implemented method of claim 15, comprising generating a graphical chart for a set of graphical tiles or a graphical layer when the set of graphical tiles or graphical layer is selected.

21. The computer-implemented method of claim 15, comprising presenting different graphical tiles representing a same numerical attribute with a same size area within each graphical layer.

22. A computer-implemented method, comprising:
receiving hierarchical information for nodes at different hierarchical levels;
generating a graphical tile for each node;
arranging graphical tiles for each hierarchical level into graphical layers;
arranging the graphical layers in a vertical stack;
presenting, in a user interface, a three dimensional orthographic projection view of the stack of graphical layers, wherein the stack of graphical layers each has multiple graphical tiles on a display; and
animating a transition between the three dimensional orthographic projection view and a two dimensional view.

23. The computer-implemented method of claim 22, comprising presenting node information when a graphical tile is selected.

24. The computer-implemented method of claim 22, comprising modifying a visual characteristic for graphical tiles representing child nodes when a graphical tile for a parent node is selected.

25. The computer-implemented method of claim 24, comprising generating a border around a first set of graphical tiles when presented in a top layer.

26. The computer-implemented method of claim 22, comprising presenting textual information for a path to a graphical tile when the graphical tile is selected.

27. The computer-implemented method of claim 22, comprising generating a graphical chart for a set of graphical tiles or a graphical layer when the set of graphical tiles or graphical layer is selected.

28. The computer-implemented method of claim 22, comprising presenting different graphical tiles representing a same numerical attribute with a same size area within each graphical layer.

29. An article of manufacture comprising a storage medium containing instructions that when executed enable a system to:
generate a tile for each node of hierarchical information;

arrange tiles for nodes of a same hierarchical level into a planar layer;
arrange the planar layers in a vertical stack;
generate a three dimensional orthographic projection with the vertical stack of planar layers each having multiple tiles;
render, in a user interface, the three dimensional orthographic projection of the vertical stack of planar layers, wherein the vertical stack of planar layers each has multiple tiles for presentation on a display; and
animate a transition between different graphical user interface views for the three dimensional orthographic projection.

30. The article of claim 29, further comprising instructions that if executed enable the system to receive user control directives and generate different graphical user interface views for the three dimensional orthographic projection based on the received user control directives.

31. The article of claim 29, further comprising instructions that if executed enable the system to present node information when a tile is selected.

32. The article of claim 29, further comprising instructions that if executed enable the system to modify a visual characteristic for tiles representing child nodes when a tile for a parent node is selected.

33. An article of manufacture comprising a storage medium containing instructions that when executed enable a system to:
generate a tile for each node of hierarchical information;
arrange tiles for nodes of a same hierarchical level into a planar layer;
arrange the planar layers in a vertical stack;
generate a three dimensional orthographic projection with the vertical stack of planar layers each having multiple tiles;
render, in a user interface, the three dimensional orthographic projection of the vertical stack of planar layers, wherein the vertical stack of planar layers each has multiple tiles for presentation on a display; and
move a planar layer to a top layer of the vertical stack when selected.

34. The article of claim 33, further comprising instructions that if executed enable the system to receive user control directives and generate different graphical user interface views for the three dimensional orthographic projection based on the received user control directives.

35. The article of claim 33, further comprising instructions that if executed enable the system to present node information when a tile is selected.

36. The article of claim 33, further comprising instructions that if executed enable the system to modify a visual characteristic for tiles representing child nodes when a tile for a parent node is selected.

37. An article of manufacture comprising a storage medium containing instructions that when executed enable a system to:
generate a tile for each node of hierarchical information;
arrange tiles for nodes of a same hierarchical level into a planar layer;
arrange the planar layers in a vertical stack;
generate a three dimensional orthographic projection with the vertical stack of planar layers each having multiple tiles;
render, in a user interface, the three dimensional orthographic projection of the vertical stack of planar layers, wherein the vertical stack of planar layers each has multiple tiles for presentation on a display; and
move a first set of tiles from a planar layer to a top layer of the vertical stack when the tiles are selected.

38. The article of claim 37, further comprising instructions that if executed enable the system to receive user control directives and generate different graphical user interface views for the three dimensional orthographic projection based on the received user control directives.

39. The article of claim 37, further comprising instructions that if executed enable the system to present node information when a tile is selected.

40. The article of claim 37, further comprising instructions that if executed enable the system to modify a visual characteristic for tiles representing child nodes when a tile for a parent node is selected.

41. An apparatus, comprising:
an orthographic projection application arranged to manage a three dimensional orthographic projection of hierarchical information, the orthographic projection application comprising:
a hierarchical information component operative to receive hierarchical information representing multiple nodes at different hierarchical levels, and parse the hierarchical information into a tree structure;
an orthographic generator component operative to generate a graphical tile for each node, arrange graphical tiles for each hierarchical level into graphical layers, and arrange the graphical layers in a vertical stack;
an orthographic presentation component operative to present, in a user interface, a three dimensional orthographic projection of the stack of graphical layers, wherein the stack of graphical layers each has multiple graphical tiles on a display; and
an animation component operative to animate a transition between different graphical user interface views for the three dimensional orthographic projection.

42. The apparatus of claim 41, the hierarchical information comprising a tree structure of nodes comprising a root node, interior nodes and leaf nodes.

43. The apparatus of claim 41, a hierarchical level of the hierarchical information comprising a set of nodes having a same distance from a root node.

44. The apparatus of claim 41, each graphical layer comprising a tree map structure of graphical tiles.

45. The apparatus of claim 41, comprising a navigation component operative to receive user control directives and generate different graphical user interface views for the three dimensional orthographic projection based on the received user control directives.

* * * * *